US009088727B2

(12) United States Patent
Trumbo (10) Patent No.: US 9,088,727 B2
(45) Date of Patent: Jul. 21, 2015

(54) SPATIALLY-VARYING FLICKER DETECTION

(75) Inventor: Matthew L. Trumbo, Fort Collins, CO (US)

(73) Assignee: Pelco, Inc., Clouis, CA (US)

( * ) Notice: Subject to any disclaimer, the term of this patent is extended or adjusted under 35 U.S.C. 154(b) by 151 days.

(21) Appl. No.: 13/081,144

(22) Filed: Apr. 6, 2011

(65) Prior Publication Data

US 2012/0320232 A1 Dec. 20, 2012

(51) Int. Cl.
*H04N 9/73* (2006.01)
*H04N 5/235* (2006.01)
*H04N 5/353* (2011.01)
*H04N 5/355* (2011.01)

(52) U.S. Cl.
CPC ........... *H04N 5/2357* (2013.01); *H04N 5/2353* (2013.01); *H04N 5/2355* (2013.01); *H04N 5/2356* (2013.01); *H04N 5/3535* (2013.01); *H04N 5/35554* (2013.01)

(58) Field of Classification Search
CPC .............. H04N 5/2357; H04N 5/2353; H04N 5/35554; H04N 5/2355
USPC ...................................................... 348/226.1
See application file for complete search history.

(56) References Cited

U.S. PATENT DOCUMENTS

| | | | |
|---|---|---|---|
| 5,793,886 A | 8/1998 | Cok | |
| 5,960,153 A | 9/1999 | Oster et al. | |
| 6,040,858 A * | 3/2000 | Ikeda | 348/242 |
| 6,271,884 B1 | 8/2001 | Chung et al. | |
| 6,295,085 B1 | 9/2001 | Munson et al. | |
| 6,710,818 B1 | 3/2004 | Kasahara et al. | |
| 7,298,401 B2 | 11/2007 | Baer | |
| 7,471,316 B2 | 12/2008 | Takahashi et al. | |
| 7,656,436 B2 | 2/2010 | Kinoshita et al. | |
| 7,764,312 B2 | 7/2010 | Ono et al. | |
| 2002/0131491 A1 | 9/2002 | Smith et al. | |
| 2003/0090566 A1* | 5/2003 | Smith et al. | 348/131 |
| 2003/0112343 A1 | 6/2003 | Katoh et al. | |
| 2006/0098112 A1* | 5/2006 | Kelly | 348/333.12 |
| 2006/0139463 A1* | 6/2006 | Heinonen | 348/239 |
| 2006/0221205 A1* | 10/2006 | Nakajima et al. | 348/226.1 |

(Continued)

FOREIGN PATENT DOCUMENTS

EP 1091571 A2 4/2001
JP 2004-112403 U1 8/2004

OTHER PUBLICATIONS

International Search Report and Written Opinion for PCT/US2012/032057 dated Dec. 12, 2012.

(Continued)

*Primary Examiner* — Antoinette Spinks
(74) *Attorney, Agent, or Firm* — Hunter Clark PLLC (57) ABSTRACT

An imaging system includes: an image module configured to produce image frames at a frame rate F, the image module being configured to capture first and second portions of each of the image frames at different times; a frequency determination module, communicatively coupled to the image module, configured to determine frequency components associated with the first and second portions over a plurality, N, of the image frames; and a flicker analysis module, communicatively coupled to the frequency determination module, configured to determine whether any of the frequency components of the first and second portions are indicative of perceptible flicker.

25 Claims, 6 Drawing Sheets

(56) References Cited

U.S. PATENT DOCUMENTS

| | | |
|---|---|---|
| 2007/0146501 A1 | 6/2007 | Matsuoka |
| 2007/0269200 A1* | 11/2007 | Rai et al. .................. 396/335 |
| 2010/0045819 A1 | 2/2010 | Pillman et al. |
| 2010/0123810 A1 | 5/2010 | Greenland et al. |
| 2011/0255786 A1* | 10/2011 | Hunter ...................... 382/190 |

OTHER PUBLICATIONS

International Preliminary Report on Patentability for International Application No. PCT/US2012/032057 dated Oct. 8, 2013, 5 pgs.

Supplementary European Search Report & European Search Opinion dated Oct. 10, 2014, for European Application No. EP12768468, 6 pgs.

* cited by examiner

SPATIALLY-VARYING FLICKER DETECTION

BACKGROUND

Image capture devices are used in a variety of devices including various cameras. For example, fixed-position cameras and pan/tilt/zoom cameras use image capture devices. The image capture devices come in a variety of forms including "global shutter" capture devices and "rolling shutter" capture devices. Global shutter capture devices capture an entire frame simultaneously while rolling shutter devices typically scroll through rows of pixels of a frame, with the capture of consecutive rows typically overlapping partially in time.

With rolling shutter capture devices, image flicker may occur due to periodic illumination either directly impinging upon the capture device or by reflection off an object in the field of view of the capture device. As the rows are scrolled through, different rows will include different portions of a cycle of the periodic illumination. Thus, stripes of relatively bright pixels and relatively dark pixels will be produced. The stripes will tend to move from frame to frame unless the image capture frequency matches a multiple of the illumination cycle.

Various techniques have been proposed to detect this flicker. For example, the flicker can be detected by taking the difference of the brightness of the same row in consecutive frames, and then looking at the difference over the vertical frame. By finding the number of peaks and valleys of the differences over the height of the frame, the frequency of the flicker is determined. Alternatively, flicker can be determined by summing the pixels in each row, and determining frequency from the product of the frame period and the AC line frequency in cycles per image frame. Alternatively still, flicker can be determined by summing the pixel intensities of rows for consecutive frames, subtracting one frame's row sum from the other, and analyzing the resulting periodic data to determine the frequency of the flicker. Further, a separate light sensor could be used to examine light intensity and identify flicker.

SUMMARY

An example of an imaging system includes: an image module configured to produce image frames at a frame rate F, the image module being configured to capture first and second portions of each of the image frames at different times; a frequency determination module, communicatively coupled to the image module, configured to determine frequency components associated with the first and second portions over a plurality, N, of the image frames; and a flicker analysis module, communicatively coupled to the frequency determination module, configured to determine whether any of the frequency components of the first and second portions are indicative of perceptible flicker.

Implementations of such an imaging system may include one or more of the following features. The system further includes an accumulation module, communicatively coupled to the image module, configured to accumulate a plurality, N, sets of information associated with the N image frames, wherein the frequency determination module is communicatively coupled to the accumulation module and is configured to apply a Fourier transform to the N sets of information to determine the frequency components associated with the first and second portions of the N image frames. The system further includes a spatial downsampling module, communicatively coupled to the image module and the accumulation module, configured to spatially downsample each of the image frames to produce the sets of information. The spatial downsampling module is configured to average pixel values over a plurality of regions of each of the image frames to produce the N sets of information associated with the N image frames, wherein distinct ones of the regions include the first and second portions, respectively.

Also or alternatively, implementations of such an imaging system may include one or more of the following features. The flicker analysis module is configured to analyze at least one of the frequency components associated with the first portion of the image frames to determine whether the at least one of the frequency components has a (1) frequency corresponding to at least one flicker frequency associated with a light source frequency of concern, and (2) a magnitude with an undesired relationship relative to a flicker magnitude threshold. The flicker analysis module is configured to determine whether the at least one of the frequency components satisfies conditions (1) and (2) only if the at least one of the frequency components corresponds to a predominant signal associated with the first portion of the frames. The at least one flicker frequency is a frequency to which at least one of 50 Hz, 60 Hz, 100 Hz, or 120 Hz aliases to when using a Fast Fourier Transform with N samples and a sampling frequency of F.

An example of a flicker detection system includes: an image module configured to produce image frames at a frame rate F, the image module being configured to capture first and second portions of each of the image frames at different times; downsampling means, communicatively coupled to the image module, for spatially downsampling the image frames to produce downsampled image frames each having third and fourth distinct regions including the first and second portions, respectively; frequency determination means, communicatively coupled to the downsampling means, for applying a Fourier transform to a plurality, N, of the downsampled image frames to produce indications of frequency components of the third and fourth portions; and flicker analysis means, communicatively coupled to the frequency determination means, for analyzing the indications of frequency components to determine whether any of the frequency components corresponds to a predominant signal in the respective region, corresponds to at least one frequency of concern, and would be perceptible to a person viewing the image frames.

Implementations of such a flicker detection system may include one or more of the following features. The system further includes accumulation means, communicatively coupled to the downsampling means and the frequency determination means, for accumulating the N downsampled frames. The downsampling means are configured to average pixel values over each of the distinct regions. The at least one frequency of concern is a frequency to which at least one of 50 Hz, 60 Hz, 100 Hz, or 120 Hz aliases to when using a Fast Fourier Transform with N samples and a sampling frequency of F.

An example of a computer program product residing on a non-transitory processor-readable medium includes instructions configured to cause a processor to: produce image frames at a frame rate F and with first and second portions of each of the image frames being captured at different times; determine frequency components associated with the first and second portions over a plurality, N, of the image frames; and determine whether any of the frequency components in either of the first or second portions individually are indicative of perceptible flicker.

Implementations of such a computer program product may include one or more of the following features. The computer program product further includes instructions configured to cause the processor to: spatially downsample each of a plurality, N, of the image frames to produce N sets of information; and apply a Fourier transform to the N sets of information to determine the frequency components associated with the first and second portions of the N image frames. The instructions configured to cause the processor to determine whether any of the frequency components in either of the first or second portions individually are indicative of perceptible flicker are configured to cause the processor to analyze at least one first frequency component associated with the first portion of the image frames to determine whether the first frequency component (1) has a frequency corresponding to at least one flicker frequency associated with a light source frequency of concern, (2) has a magnitude with an undesired relationship relative to a flicker magnitude threshold, and (3) corresponds to a predominant signal associated with the first portion of the image frames.

An example of a method of detecting flicker in image frames includes: producing the image frames at a frame rate F and with first and second portions of each of the image frames being captured at different times; determining frequency components associated with the first and second portions over a plurality, N, of the image frames; and determining whether at least one of a first frequency component of the first portion or a second frequency component of the second portion is indicative of perceptible flicker.

Implementations of such a method may include one or more of the following features. The method further includes: spatially downsampling each of a plurality, N, of the image frames to produce N sets of information; and applying a Fourier transform to the N sets of information to determine the frequency components associated with the first and second portions of the N image frames. Determining whether at least one of the first frequency component of the first portion or the second frequency component of the second portion is indicative of perceptible flicker includes determining whether the first frequency component (1) has a frequency corresponding to at least one flicker frequency associated with a light source frequency of concern, (2) has a magnitude with an undesired relationship relative to a flicker magnitude threshold, and (3) corresponds to a predominant signal associated with the first portion of the image frames.

Items and/or techniques described herein may provide one or more of the following capabilities, as well as other capabilities not mentioned. Spatially-varying, localized flicker in images can be detected to facilitate its reduction or elimination. Flicker in wide-dynamic-range, rolling-shutter imaging systems can be detected to facilitate its reduction or elimination. It may be possible for an effect noted above to be achieved by means other than that noted, and a noted item/technique may not necessarily yield the noted effect. Further, at least some implementations discussed herein or derivable from the discussion herein may not provide one or more of the capabilities discussed.

Other capabilities and applications will be made apparent by the following detailed description.

DETAILED DESCRIPTION

Techniques are disclosed for detecting spatially-varying flicker in captured images. For example, a rolling shutter imaging system uses different capture times for different portions of a captured image. Portions of images provided by the imaging system may exhibit or contain flicker, while other portions do not. Multiple frames are each spatially downsampled, and the down-sampled frames are analyzed to determine their frequency components (e.g., using a Fourier transform). The frequency components are analyzed to determine whether any of them correspond to a flicker frequency and are of a sufficient magnitude to be perceptible to a person viewing the frames. Other techniques are within the scope of the disclosure.

Figure 1:
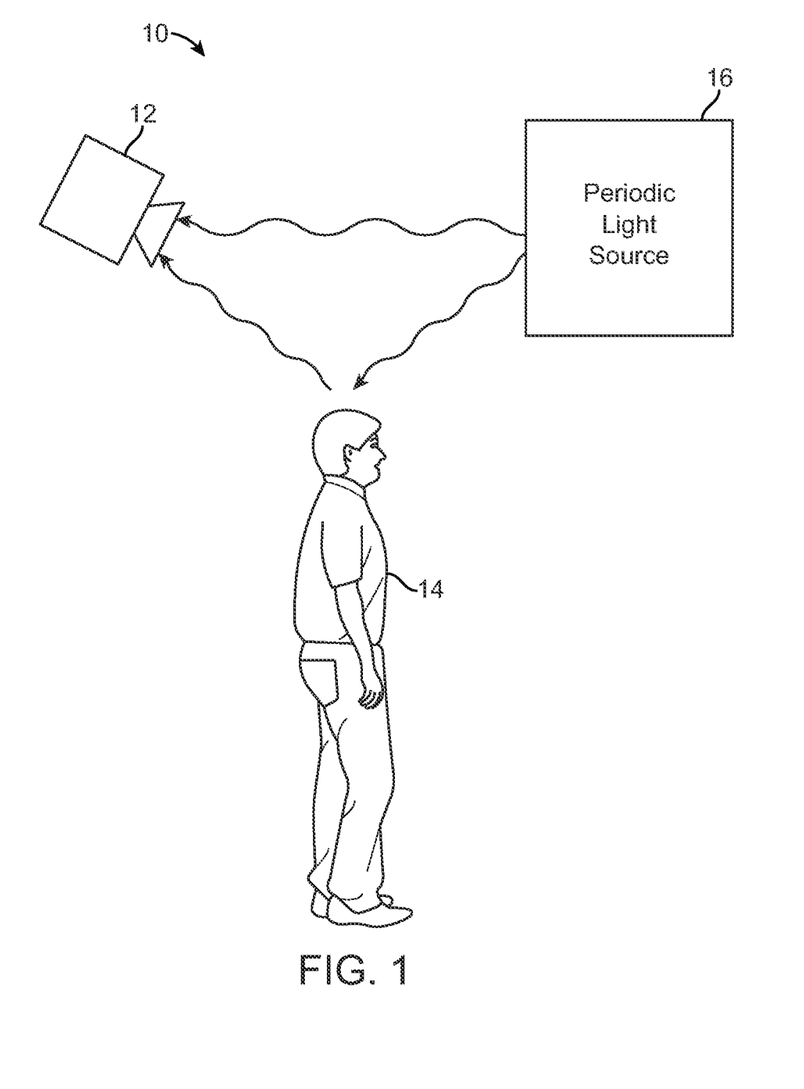
FIG. 1 is a simplified diagram of a video system.

Referring to FIG. 1, a video system 10 includes a camera 12, a subject 14, and a light source 16. The camera 12 is configured to capture image frames of anything in its field of view, here the subject 14. The light source 16 is a periodic light source, producing light that varies in intensity over time, e.g., a fluorescent light having a frequency of, e.g., 50 Hz, 60 Hz, 100 Hz, 120 Hz, etc.

The camera 12 is configured to produce images where spatially-separate pixels have different exposure durations, i.e., being able to receive light for different amounts of time, and where spatially-separate pixels have different exposure times, i.e., receive light at different times. Here, the camera 12 is a wide dynamic range (WDR), rolling shutter camera. Thus, the camera 12 is configured to capture rows of pixels of various exposure durations and at different times, while the camera may be capturing more than one row of pixels concurrently (see FIG. 4).

Figure 2:
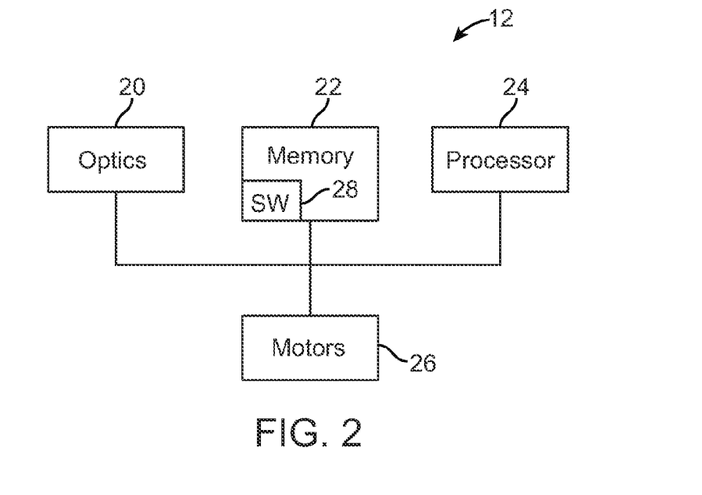
FIG. 2 is a block diagram of a camera shown in FIG. 1.

Referring also to FIG. 2, the camera 12 includes optics 20, memory 22, a processor 24, and motors 26. The motors 26 are configured to drive the camera 12 to pan and tilt. Alternatively, a fixed-position camera or a camera that moves in only one axis (e.g., pan or tilt, but not both) could be used. The optics 20 include one or more lenses and a rolling shutter to focus the camera 12 and to capture light, convert the captured light to digital electrical signals, and transfer the electrical signals to the memory 22. The processor 24 is preferably an intelligent device, e.g., a central processing unit (CPU) such as those made by Intel® Corporation or AMD®, a microcontroller, an application specific integrated circuit (ASIC), etc. The memory 22 includes random access memory (RAM) and read-only memory (ROM) and could also one or more disk drives including a hard-disk drive, a CD-ROM drive, and/or a zip drive, etc. The memory 22 includes processor-readable, processor-executable software code 28 containing instructions for controlling the processor 24 to perform functions described below (although the description may read that the software 28 performs the function(s)). The functions implement a flicker detection and correction system. The software 28 can be loaded into the memory 22 by being downloaded via a network connection, uploaded from a disk, etc. Further, the software 28 may not be directly executable, e.g., requiring compiling before execution, Referring also to FIG. 3, the processor 24 and software 28 implement a flicker detection module 40. The flicker detection module 40 includes an image module 41, a spatial downsample/segmentation module 46, an accumulation module 48, a frequency determination module 50, and a flicker analysis module 52. The image module 41 includes an image capture module 42 and a stitch module 44 to capture multiple candidate image frames and form composite image frames from the multiple image frame candidates. The image module 41 is communicatively coupled to the spatial downsample/segmentation module 46, which is communicatively coupled to the accumulation module 48, which is communicatively coupled to the frequency determination module 50, which is communicatively coupled to the flicker analysis module 52. The flicker detection module 40 is configured to determine the presence and frequency of perceptible flicker in images captured by the camera 12 such that the flicker can be accounted for, e.g., corrected or otherwise reduced using known techniques.

Figure 3:
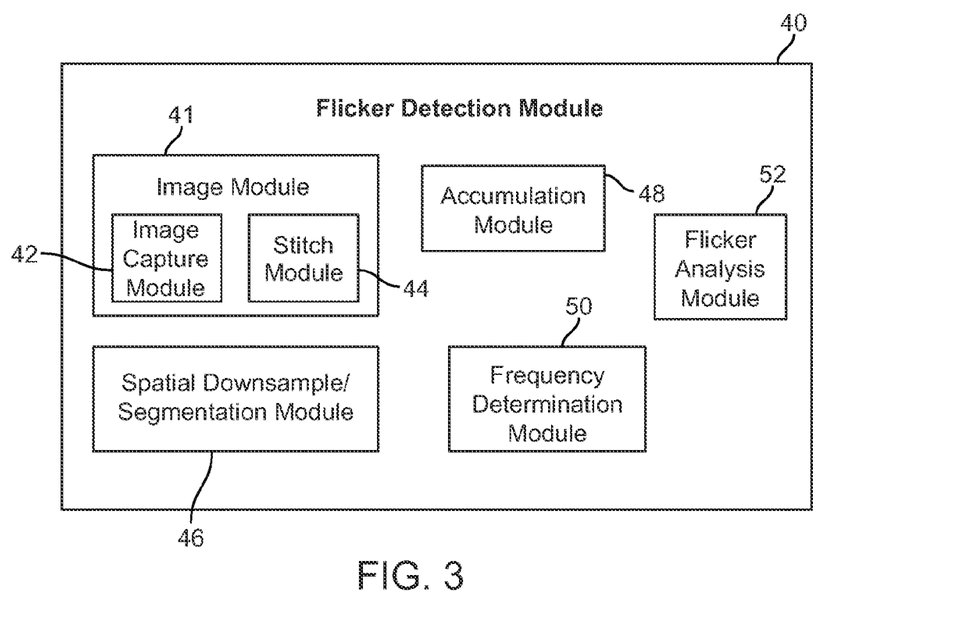
FIG. 3 is a functional block diagram of a flicker detection module implemented by a processor shown in FIG. 2.

The image capture module 42 is configured to control the optics 20 and the motors 26 to capture candidate image frames each comprising a two-dimensional array of pixels. The image capture module 42 is configured to control the motors 26 to move the camera as desired and to control the optics 20 to open shutters sequentially for different rows of pixels (e.g., rows of charge-coupled devices (CCDs) corresponding to the pixels).

Figure 4:
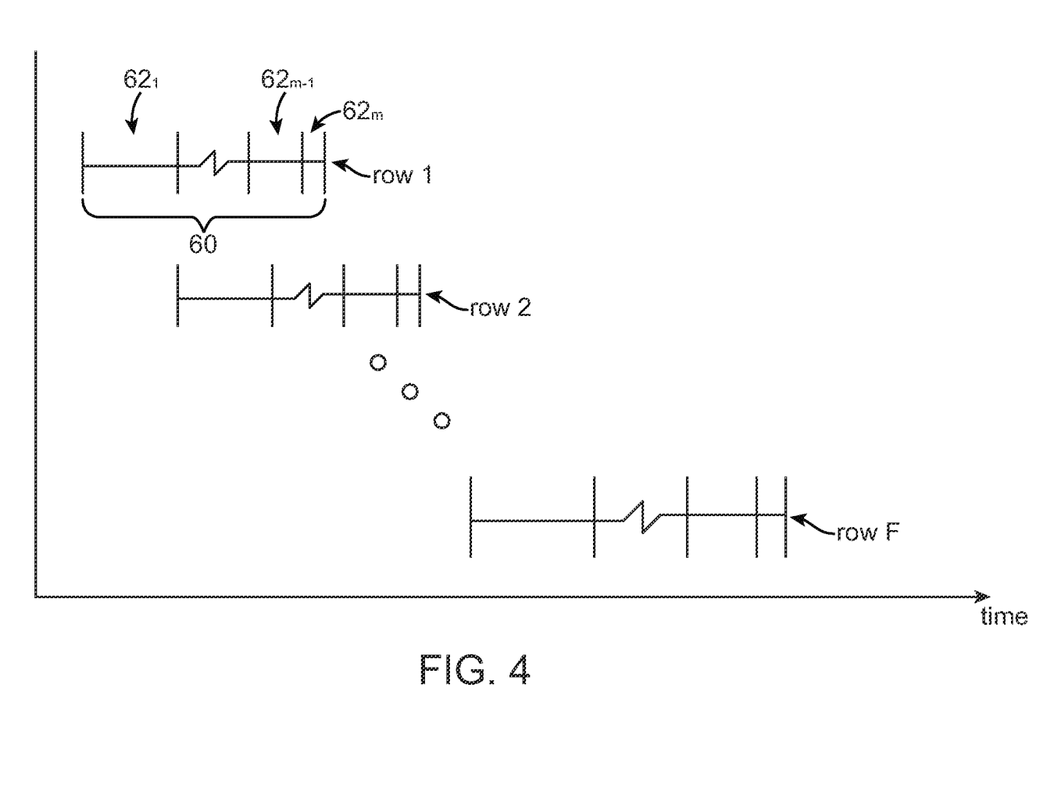
FIG. 4 is a graph of exposure times of a frame captured by the camera shown in FIG. 1.

Referring also to FIG. 4, the image capture module 42 implements a rolling shutter, wide dynamic range technique. As shown, the module 42 causes the optics 20 to capture data for each row of pixels in a candidate image frame (i.e., one set of rows of pixels) over a total collection duration 60. The module 42 may sample the collected light data at several points during the duration 60 to yield data for multiple exposure durations or, as here, cause the optics 20 to collect data for each of multiple durations $62_1$-$62_m$ consecutively. While the durations 62 are shown as being implemented from the longest to the shortest in order, the durations 62 can be obtained in any order. Data are collected for multiple rows concurrently, but as can be seen from FIG. 4, not all rows in an image frame are exposed (i.e., have their data collected) concurrently. Thus, light data for different spatial portions of an image frame are collected at different times. Further, multiple exposure/data collection durations for each pixel are available and stored in the memory 22. The collected data for each duration 62 are stored as a candidate image frame in the memory 22. The data for frames are collected at a frame rate F, e.g., of 30 frames per second.

Figure 5:
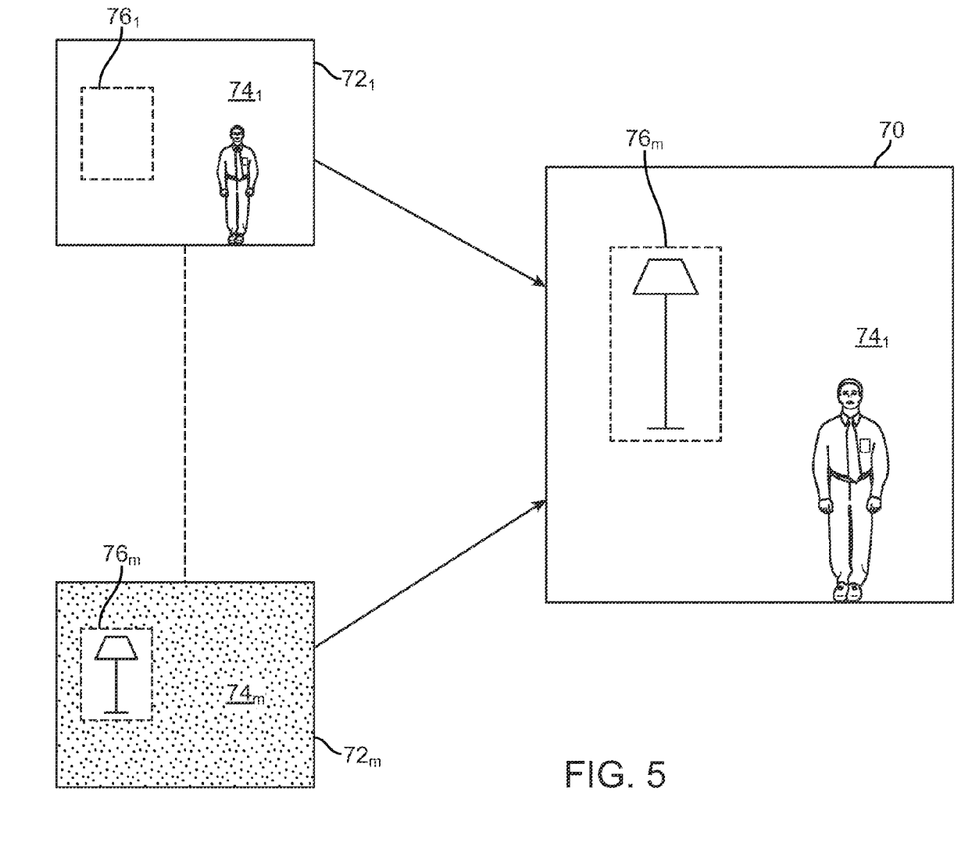
FIG. 5 is a graphical flow diagram of stitching multiple frames of different exposure times captured by the camera shown in FIG. 1 to produce a single image frame.

Referring also to FIG. 5, the stitch module 44 of the image capture module 42 is configured to assemble a composite image frame 70 from n candidate image frames 72. The stitch module 44 analyzes the image frame candidates 72 and extracts the portions of each frame candidate 72 that are properly exposed. Where there are multiple candidates 72 in which the same portion is properly exposed, the module 44 determines the portion with the best exposure from the corresponding candidate. As shown in FIG. 5, a portion $74_1$ in the candidate image $72_1$ is properly exposed, while a portion $76_1$ is overexposed (e.g., being too bright for the duration $62_1$), with too much light being collected for the portion $76_1$, resulting in poor image quality (here, being washed out). In the image candidate $72_m$, however, the portion 74m is underexposed, yielding poor image quality (here being too dark for the corresponding duration $62_m$), while the portion $76_m$ is properly exposed. For this example, the stitch module 44 will stitch the portion $74_1$ from the image candidate $72_1$ together with the portion $76_m$ from the image candidate $72_m$ to form the composite image frame 70 with the entire frame being properly exposed. Thus, different spatial portions of the image frame 70 could have different exposure durations 62 associated with their pixels (as long as more than one candidate image 72 is used to form the composite image 70, although the image 70 could be a single one of the images 72). Consequently, while the duration 621 may be long enough that a 50 Hz, 60 Hz, 100 Hz, or 120 Hz light source will not induce noticeable flicker, if the duration $62_m$ is not, then flicker effects may induced, and may be induced over only part (or parts) of the image frame 70. These effects may then be perceived when multiple frames 70 are viewed in succession. Thus, while periodic/oscillating light may be incident on all or a significant part of a lens of the camera 12, the flicker effect may be localized, i.e., induced or perceptible over less than the region on which the periodic/oscillating light is incident. The flicker may thus be non-uniform in the image frame 70, being present/perceptible in one or more regions and not present/perceptible in one or more other regions.

Figure 6:
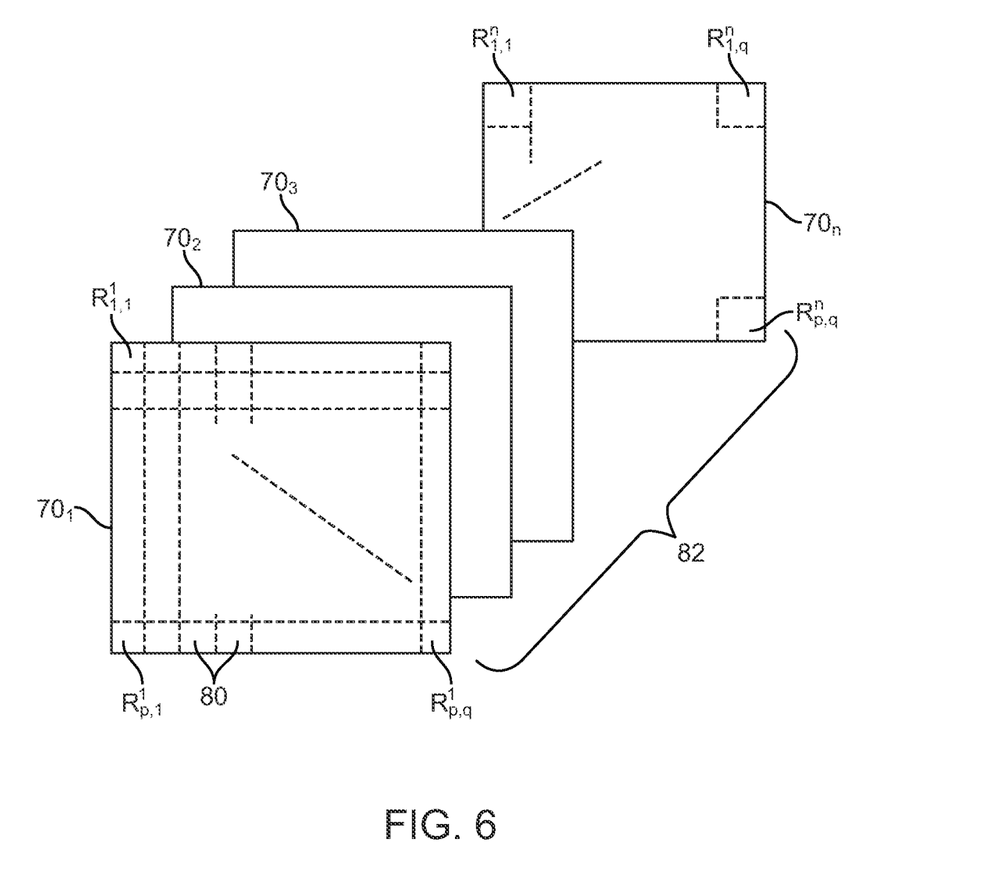
FIG. 6 is a simplified diagram of multiple, spatially-segmented image frames.

Referring to FIGS. 3 and 6, the spatial downsample/segmentation module 46 is configured to spatially downsample the image frames 70. The module 46 segments each of the frames 70 into segments 80, here a grid of rectangular, equal-sized segments 80, although other shapes could be used, and different-sized segments may be used within a frame 70. For example, for a 64× downsampling of a frame 70 with 1280× 960 pixels, the module 46 will segment the frame 70 into a 20×15 grid of segments 80. The module 46 is further configured to produce a single value, R, to represent the pixel intensities of each segment 80. Here, the module 46 is configured to average the pixel intensities to produce the value $R_{p,q}^n$ for each segment 80 of row p, of column q, of frame n. Alternatively, other values could be used, e.g., the sum of the pixel intensities, etc.

The accumulation module 48 is configured to associate multiple stored composite image frames 70. The accumulation module 48 accumulates/associates a set 82 of a quantity, n, of the frames 70 for use, as discussed below, to detect spatially-varying flicker, i.e., flicker that appears in less than all pixels in the image frames 70. This may be important in order to avoid, for example, applying flicker correction over the entire frame which could correct flicker where it exists but induce inverted flicker where none existed before.

The frequency determination module 50 is configured to analyze the accumulated frames 70 to determine frequency components of the segments 80. The module 50 applies a Fourier transform (e.g., a fast Fourier transform (FFT)) to the segments 80 of a set of n segmented frames. The result of the FFT will be indications of frequency components of the segments 80.

The flicker analysis module 52 is configured to determine whether the predominant frequency component of each of the segments 80 is indicative a frequency of concern that will induce flicker, e.g., 50, 60, 100, or 120 Hz. Because it is difficult, if not impossible, to detect frequency components exceeding half of the sampling frequency, and because here the frequencies of concern (e.g., 50, 60, 100, 120 Hz) are over the sampling frequency of 30 Hz, the module 52 looks for aliased frequency components corresponding to the frequencies of concern. The module looks for aliased frequencies according to:

$$Fa = |Fd - N*Fs| \quad (1)$$

where: Fa is the aliased frequency;
Fs is the sampling frequency;
Fd is the frequency of concern; and
N=round(Fd/Fs).

Thus, an aliased frequency Fa can be determined for each frequency of concern Fd. The module 52 determines whether the predominant frequency component (i.e., the highest-intensity component) of each segment 80 corresponds to one of the aliased frequencies Fa corresponding to (indicative of) one of the frequencies of concern Fd.

The module 52 is further configured to determine whether frequency components of concern have magnitudes that will be perceptible to a human observer. For any segment 80 whose predominant frequency component corresponds to one of the aliased frequency components of concern, the module 52 determines whether the magnitude of this component for that segment 80 has an undesirable relationship relative to, e.g., exceeds, a threshold associated with visible perceptibility of a human. The module 52 determines whether:

$$I_{p,q} > TP \quad (2)$$

where: $Tp = Ta * Tm$ (3)

$$Tm = \frac{\text{average intensity of segment } 80p, q \text{ over } n \text{ frames}}{\text{maximum range of images}} \quad (4)$$

Ta=observed constant
where $I_{p,q}$ is the intensity of the component of the aliased frequency of concern over the n frames 70 for the segment $80_{p,q}$, Tp is the threshold for perceptible flicker by a human, Ta is an observed amplitude threshold (determined from experimental results of persons observing images and noting areas of flicker), and Tm is a threshold modifier. For Tm, the average pixel intensity of all frequency components of light for the given segment over n frames is used. The maximum range is the maximum value for the particular image, e.g., 255 for an 8-bit image. If the module 52 determines that $I_{p,q}$ exceeds the threshold Tp, then the module 52 will trigger flicker abatement (correction) for the segment $80_{p,q}$.

The value of the perceptible flicker threshold Tp depends upon the tone-map compression currently used and the dynamic range in the scene shown by the frames 70. The value of the threshold Tp is dependent upon how much compression is employed as this effects the magnitude of perceptible flicker. This is accounted for in the threshold modifier Tm.

Figure 7:
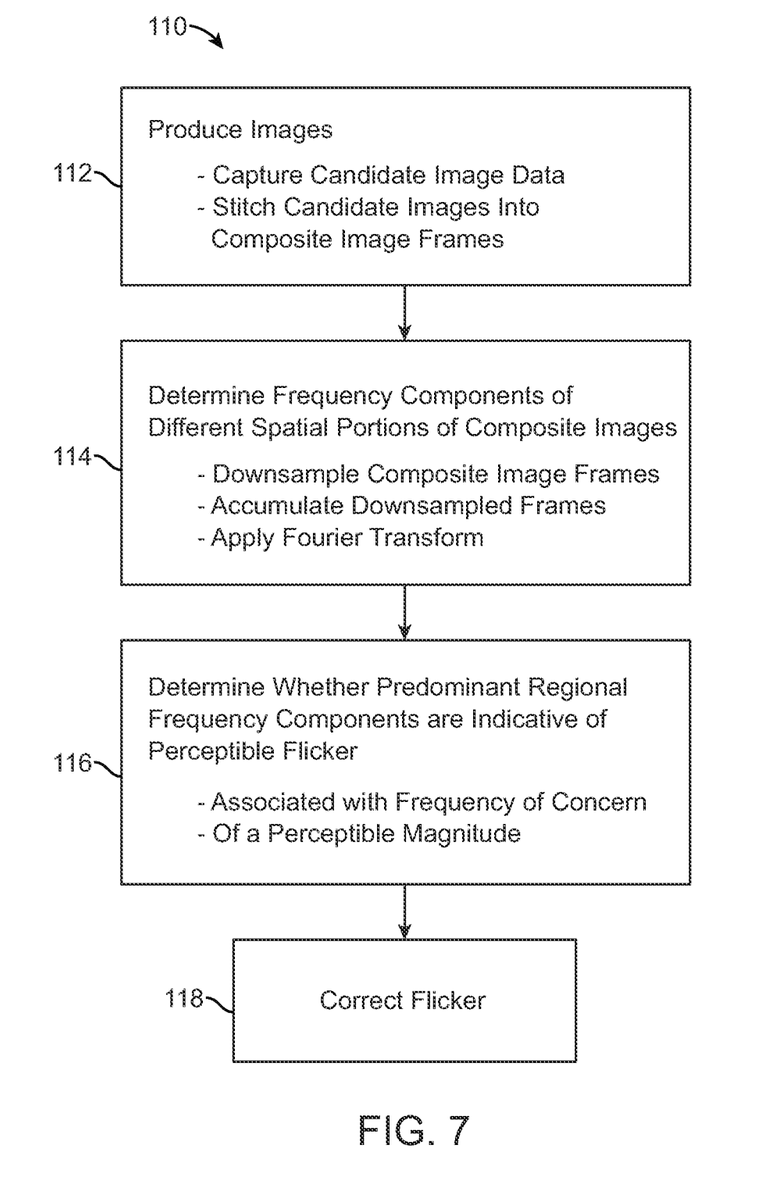
FIG. 7 is a block flow diagram of a process of detecting spatially varying flicker.

Referring to FIG. 7, with further reference to FIGS. 1-6, a process 110 of detecting and correcting spatially-varying flicker includes the stages shown. The process 110 is, however, an example only and not limiting. The process 110 can be altered, e.g., by having stages added, removed, rearranged, combined, and/or performed concurrently.

At stage 1 f 2, image frames 70 are produced. The image capture module 42 captures data for candidate image frames 72 using disparate exposure durations 62. The stitch module 44 analyzes the candidate image frames 72 and stitches together the composite image frames 70 using properly exposed portions from one or more of the candidate image frames 72.

At stage 114, frequency components of different portions of multiple composite frames 70 are determined. The composite frames 70 are segmented by the spatial downsample/ segmentation module 46. The module 46 divides the frames 70 into sets of the segments 80, and determines the downsample value R for each of the segments indicative of the pixel intensity across each respective segment 80. The accumulation module 48 accumulates multiple, N, composite frames 70 for frequency analysis. The frequency determination module 50 operates on the N accumulated frames 70 to determine frequency components of light incident upon the camera 12 corresponding to each of the segments 80. Here, the module 50 applies an FFT to the segment information to determine the frequency components.

At stage 116, it is determined whether the predominant frequency component of respective, spatially-distinct segments 80 are indicative perceptible flicker. The flicker analysis module determines the predominant frequency component of each segment 80. The module 52 determines whether the predominant frequency component corresponds to an aliased frequency of concern in accordance with Equation (1). For frequency components corresponding to these aliased frequencies, the module 52 determines whether the component would be perceptible to a human observer by evaluating Equation (2). If the predominant frequency component is of a frequency associated with a frequency of concern, and of a magnitude such that a human observer would be able to perceive flicker in a set of the frames 70, then the module 52 detects that the corresponding segment 80 has flicker.

At stage 118, flicker is corrected. The module 52 identifies the segment(s) 80 having flicker, and the magnitude(s) and frequency(ies) of the flicker. Known techniques can be applied by the processor 24 according to instructions in the software 28 to reduce or eliminate the flicker in the composite frames 70 (as opposed to the downsampled frames), or at least weaken it to where it is not perceptible to a human observer.

Other Considerations

Variations and modifications to the specific examples given can be made without departing from the scope of the disclosure or claims. The specific examples disclosed herein are not liming of the following claims. For example, while the description above described compensation of both phase and amplitude of the synthesized waveforms as a function of stepper motor velocity, implementations can be used that compensate for phase or amplitude, but not both, by removing the respective components discussed above.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "processor-readable medium," as used herein, refer to any medium that participates in providing data that causes a machine to operate in a specific fashion. In an embodiment implemented using a computer system, various computer-readable media might be involved in providing instructions/code to a processors) for execution and/or might be used to store and/or carry such instructions/code (e.g., as signals). In many implementations, a computer-readable medium is a non-transitory, physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory. Transmission media include, without limitation, coaxial cables, copper wire and fiber optics. Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPRQM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure, Further, the preceding description details a security camera system. However, the systems and methods described herein may be applicable to other forms of camera systems, or other systems generally.

Furthermore, examples of the methods described may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Further, more than one invention may be disclosed.

What is claimed is:

1. An imaging system comprising:
an image module configured to produce image frames at a frame rate F, the image module being configured to capture first and second portions of each of the image frames, each of the first and second portions comprising a two-dimensional array of pixels having a plurality of horizontal pixels and a plurality of vertical pixels, the first portion being separate from the second portion, the image frames including a plurality of candidate images having different exposure durations;
a frequency determination module, communicatively coupled to the image module, configured to determine frequency components associated with the first and second portions over a plurality, N, of the image frames;
a flicker analysis module, communicatively coupled to the frequency determination module, configured to determine whether any frequency component associated with the first portion or the second portion, respectively, is indicative of perceptible flicker such that the flicker analysis module is capable of determining a frequency component indicative of perceptible flicker over less than an entire area of the image frames; and
a stitch module configured to replace the first portion of a first image frame with a first portion of a second image frame from the plurality of candidate images, the first portion of the first image frame corresponding to the first portion in the second image frame, the first portion of the first image being either underexposed or overexposed, and the first portion of the second image being properly exposed.

2. The system of claim 1 further comprising an accumulation module, communicatively coupled to the image module, configured to accumulate a plurality, N, sets of information associated with the N image frames, wherein the frequency determination module is communicatively coupled to the accumulation module and is configured to apply a Fourier transform to the N sets of information to determine the frequency components associated with the first and second portions segments of the N image frames.

3. The system of claim 2 further comprising a spatial downsampling module, communicatively coupled to the image module and the accumulation module, configured to spatially downsample each of the image frames to produce the sets of information.

4. The system of claim 3 wherein the spatial downsampling module is configured to average pixel values over each of a plurality of regions of each of the-image frames to produce the N sets of information associated with the N image frames, wherein distinct ones of the regions include the first and second portions, respectively.

5. The system of claim 1 wherein the flicker analysis module is configured to analyze at least one of the frequency components associated with the first portion of the image frames to determine whether the at least one of the frequency components has a (1) frequency corresponding to at least one flicker frequency associated with a light source frequency of concern, and (2) a magnitude with an undesired relationship relative to a flicker magnitude threshold.

6. The system of claim 5 wherein the flicker analysis module is configured to determine whether the at least one of the frequency components satisfies conditions (1) and (2) only if the at least one of the frequency components corresponds to a predominant signal associated with the first portion of the image frames.

7. The system of claim 5 wherein the at least one flicker frequency is a frequency to which at least one of 50 Hz, 60 Hz, 100 Hz, or 120 Hz aliases to when using a Fast Fourier Transform with N samples and a sampling frequency of F.

8. The system of claim 1 wherein the flicker analysis module is capable of determining that a first frequency component associated with the first portion is indicative of perceptible flicker and that a second frequency component associated with the second portion is indicative of perceptible flicker.

9. The system of claim 1 wherein the flicker analysis module is capable of determining that a first frequency component associated with the first portion is indicative of perceptible flicker and that a second frequency component associated with the second portion has no frequency component indicative of flicker.

10. The system of claim 1 wherein a size and shape of the first portion is configured to include an object having a different brightness of the first image than the second portion of the first image.

11. The imaging system of claim 1 wherein the first portion of the first image frame occupies an identical area of the first image frame as the first portion of the second image frame does in the second image frame.

12. The imaging system of claim 1 wherein the first portion of the second image frame is surrounded by the second portion of the second image frame.

13. The imaging system of claim 1 wherein the second portion of the first image frame is properly exposed and lacking of perceptible flicker.

14. A flicker detection system comprising:
   an image module configured to produce image frames at a frame rate F, the image module being configured to capture first and second portions of each of the image frames, each of the first and second portions comprising a two-dimensional array of pixels having a plurality of horizontal pixels and a plurality of vertical pixels, the first portion being separate from the second portion, the image frames including a plurality of candidate images having different exposure durations;
   downsampling means, communicatively coupled to the image module, for spatially downsampling the image frames to produce downsampled image frames each having third and fourth distinct regions including the first and second portions, respectively, each of the third and fourth regions corresponding to less than all of respective image frames;
   frequency determination means, communicatively coupled to the downsampling means, for applying a Fourier transform to a plurality, N, of the downsampled image frames to produce separate indications of frequency components of the third and fourth portions, respectively;
   flicker analysis means, communicatively coupled to the frequency determination means, for analyzing the indications of frequency components to determine whether any of the frequency components corresponds to a predominant signal in the respective region, corresponds to at least one frequency of concern, and would be perceptible to a person viewing the image frames; and
   stitch means for replacing the first portion of a first image frame with a first portion of a second image frame from the plurality of candidate images, the first portion of the first image frame corresponding to the first portion in the second image frame, the first portion of the first image being either underexposed or overexposed, and the first portion of the second image being properly exposed.

15. The system of claim 14 further comprising accumulation means, communicatively coupled to the downsampling means and the frequency determination means, for accumulating the N downsampled frames.

16. The system of claim 14 wherein the downsampling means are configured to average pixel values over each of the distinct regions.

17. The system of claim 14 wherein the at least one frequency of concern is a frequency to which at least one of 50 Hz, 60 Hz, 100 Hz, or 120 Hz aliases to when using a Fast Fourier Transform with N samples and a sampling frequency of F.

18. The system of claim 14 wherein the flicker analysis means are capable of determining that a first frequency component associated with the first portion is indicative of perceptible flicker and that a second frequency component associated with the second portion is indicative of perceptible flicker.

19. The system of claim 14 wherein the flicker analysis means are capable of determining that a first frequency component associated with the first portion is indicative of perceptible flicker and that a second frequency component associated with the second portion has no frequency component indicative of flicker.

20. A computer program product residing on a non-transitory processor-readable medium and comprising instructions configured to cause a processor to:
   produce image frames at a frame rate F and with first and second portions of each of the image frames being captured, each of the first and second portions comprising a two-dimensional array of pixels having a plurality of horizontal pixels and a plurality of vertical pixels, the first portion being separate from the second portion, the image frames including a plurality of candidate images having different exposure durations;
   determine frequency components associated with the first and second portions over a plurality, N, of the image frames;
   determine whether any frequency component associated with the first portion or the second portion, respectively, is indicative of perceptible flicker such that the instructions are configured to cause the processor to determine a frequency component indicative of perceptible flicker over less than an entire area of the image frames; and
   assemble a composite image frame by adding the first portion of a first image frame to a second image frame from the plurality of candidate images in place of the first portion of the second image frame, the first portion of the second image frame being either underexposed or overexposed, and the first portion of the first image frame being properly exposed.

21. The computer program product of claim 20 further comprising instructions configured to cause the processor to:
   spatially downsample each of the plurality, N, of the image frames to produce N sets of information; and
   apply a Fourier transform to the N sets of information to determine the frequency components associated with the first and second portions of the N image frames.

22. The computer program product of claim 20 wherein the instructions configured to cause the processor to determine whether any of the frequency components in either of the first or second portions individually are indicative of perceptible flicker are configured to cause the processor to analyze at least one first frequency component associated with the first portion of the image frames to determine whether the first frequency component (1) has a frequency corresponding to at least one flicker frequency associated with a light source frequency of concern, (2) has a magnitude with an undesired relationship relative to a flicker magnitude threshold, and (3) corresponds to a predominant signal associated with the first-portion of the image frames.

23. A method of detecting flicker in image frames, the method comprising:
   producing the image frames at a frame rate F, and with first and second portions of each of the image frames being captured, each of the first and second portions comprising a two-dimensional array of pixels having a plurality of horizontal pixels and a plurality of vertical pixels, the first portion being separate from the second portion, the image frames including a plurality of candidate images having different exposure durations;

determining a first frequency component associated with the first portion and a second frequency component, inequal to the first frequency component, associated with the second portion of the image frames;

determining whether at least one of the first frequency component associated with the first portion or the second frequency component associated with the second portion is indicative of perceptible flicker; and replacing the first portion of a first image frame with the first portion of a second image frame from the plurality of candidate images, the first portion of the first image frame corresponding with first portion of the second image frame, the first portion of the first image being either underexposed or overexposed, and the first portion of the second image being properly exposed.

24. The method of claim 23 further comprising:
spatially downsampling each of a plurality, N, of the image frames to produce N sets of information; and
applying a Fourier transform to the N sets of information to determine the frequency components associated with the first and second portions of the N image frames.

25. The method of claim 23 wherein determining at least one of the first frequency component associated with the first portion or the second frequency component associated with the second portion is indicative of perceptible flicker includes determining whether the first frequency component (1) has a frequency corresponding to at least one flicker frequency associated with a light source frequency of concern, (2) has a magnitude with an undesired relationship relative to a flicker magnitude threshold, and (3) corresponds to a predominant signal associated with the first portion of the image frames.

* * * * *